United States Patent
Hoffman

[15] 3,641,537
[45] Feb. 8, 1972

[54] METERING SYSTEM HAVING A REMOTE REGISTER

[72] Inventor: Emil deCoudres Hoffman, Raleigh, N.C.
[73] Assignee: Westinghouse Electric Corporation, Pittsburgh, Pa.
[22] Filed: Apr. 16, 1969
[21] Appl. No.: 816,503

[52] U.S. Cl. .......................... 340/205, 335/234, 340/266, 340/203
[51] Int. Cl. ......................................... G08c 19/16
[58] Field of Search ............... 340/205, 266; 335/229, 230, 335/234

[56] References Cited

UNITED STATES PATENTS

| | | | |
|---|---|---|---|
| 1,675,919 | 7/1928 | Babcock | 335/230 |
| 3,198,995 | 8/1965 | Grebe | 335/234 |
| 1,079,229 | 11/1913 | Fitzgerald | 340/205 |
| 2,028,501 | 1/1936 | Cowan | 340/205 |
| 2,082,038 | 6/1937 | West et al. | 340/205 |
| 2,084,742 | 6/1937 | Pudelko | 340/205 |
| 3,309,152 | 3/1967 | Ramsey et al. | 308/10 |

Primary Examiner—John W. Caldwell
Assistant Examiner—Robert J. Mooney
Attorney—A. T. Stratton and C. L. Freedman

[57] ABSTRACT

Information is transmitted from a meter to a remote register. At the meter a transmitter is provided which generates two groups of unidirectional pulses having different polarities. The changes from a group of one polarity to a group of another polarity occur at a rate dependent on a variable quantity being measured. The pulses are transmitted to the remote register for application to an electromagnet which develops a magnetic field having a direction dependent on the polarity of the pulses. A polarized magnetic armature disposed in the field oscillates a pawl at a rate dependent on the rate of change in the direction of the magnetic field. The pawl actuates indicators which form part of the remote register.

4 Claims, 3 Drawing Figures

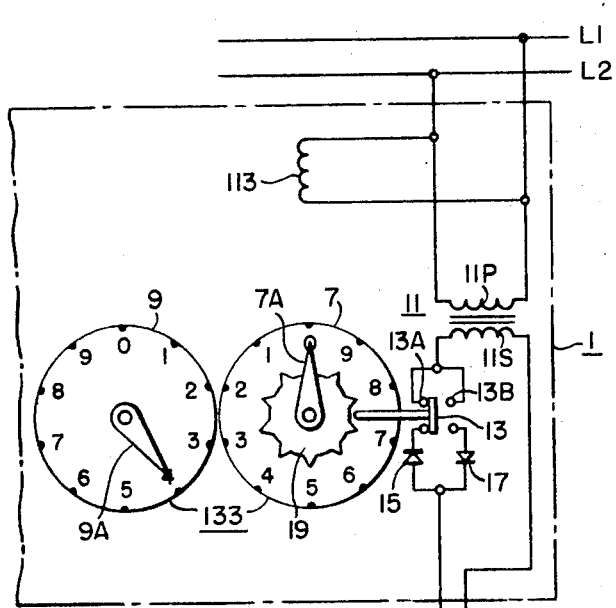

3,641,537

METERING SYSTEM HAVING A REMOTE REGISTER

BACKGROUND OF THE INVENTION

1. Field of the Invention

This invention relates to the transmission of information to a remote point and it has particular relation to the transmission from a meter to a remote register of information concerning a service supplied by a public utility.

Although the invention may be employed for various services such as heat, water, and gas it will be discussed with reference to the measurement of electric energy.

2. Description of the Prior Art

In one remote register system a switch is opened and closed at a rate dependent on the variable quantity being measured. This switch controls the transmission of alternating current to a remote register. At the remote register the alternating current controls the heat of a bimetal which actuates a pawl to advance the remote register.

In another proposal the meter transmitter includes a switch and a diode which establish repetitive cycles. In each cycle, four periods are established. During a first period, unidirectional pulses of a first polarity are transmitted, during a second period nothing is transmitted, during a third period unidirectional pulses of a reverse polarity are transmitted and during the fourth period nothing is transmitted. At the remote register a ten-pole magnetic-disc motor is operated by the transmitted signal to advance the register.

SUMMARY OF THE INVENTION

As previously noted the invention is suitable for various services supplied by public utilities. However, the invention is particularly suitable for electric watthour meters and will be described as applied to such a meter.

In accordance with the invention the meter is provided with a transmitter for generating a plurality of repetitive cycles which occur at a rate dependent on the magnitude of the quantity being measured. Each cycle is divided into two parts. During a first part, unidirectional pulses of a first polarity are transmitted to a remote receiver or register. During the second part of the cycle, unidirectional pulses of a second or opposite polarity are transmitted to the remote register. The transition from one part to a second part of a cycle occurs virtually instantaneously.

At the remote register the transmitted signal is employed for generating a magnetic field having a direction which depends on the polarity of the transmitted pulse. A polarized magnetic armature is located in this field for limited rotational movement. The armature oscillates between two positions in accordance with reversals in polarity of the transmitted signal. The armature oscillates a double pawl which contacts with a toothed wheel for the purpose of advancing a remote register.

Inasmuch as a remote register can be advanced only when the polarity of the transmitted signal is reversed, intermittent initial closure of the transmitter switch cannot produce false registration of the remote register.

Inasmuch as there is no "off" period in the signal transmission there is little likelihood that vibration of or externally induced transients will cause the remote register to operate incorrectly.

Because of the magnetic polarization of the armature, the armature is in effect "latched" in one position or the other by magnetic attraction. This prevents false registration in case of a loss of supply voltage during the transmission of an operating signal and prevents movement of the remote register as the result of vibration during such periods.

It is therefore an object of this invention to provide a metering system having a remote register wherein the remote register is relatively immune to errors due to vibration.

It is another object of the invention to provide a metering system having a remote register wherein the register is relatively free of errors due to loss of power.

It is an additional object of the invention to provide a metering system having a remote register wherein the register is not subject to false registration.

BRIEF DESCRIPTION OF THE DRAWING

Other objects of the invention will be apparent from the following description taken in conjunction with the accompanying drawing, in which:

FIG. 1 is a schematic view with parts shown in elevation and parts broken away of a metering system embodying the invention;

FIG. 2 is a view in side elevation of a motor assembly employed in the system of FIG. 1; and FIG. 3 is a view in top plan of an armature employed in the embodiment of FIG. 1.

DESCRIPTION OF THE PREFERRED EMBODIMENT

Referring to the drawing, FIG. 1 shows a metering station 1 which contains a measuring device suitable for measuring a variable quantity such as service provided by a public utility. As previously noted it will be assumed that the measuring device takes the form of an electric watthour meter.

Frequently, the watthour meter is located in a relatively inaccessible place. In order to permit the meter to be read at a more convenient or accessible location a remote station 3 is provided which is spaced from the metering station 1 and which is coupled to the metering station through a signal transmission circuit 5.

To simplify the presentation of the invention it will be assumed that the meter employed in the metering station 1 is of the type illustrated in the Ramsey Jr. et al. U.S. Pat. No. 3,309,152, which issued Mar. 14, 1967. This patent discloses a conventional register 133 which is reproduced in part in the present FIG. 1 with the same reference character applied thereto. The conventional register employs several decade counters for the purpose of indicating the electric energy, usually in kilowatt hours, which has been supplied by a public utility to the metering station. For example, the units dial 7 has a pointer 7A mounted for rotation relative thereto for the purpose of indicating units of kilowatt hours from zero to 10. A second dial 9 has a pointer 9A mounted for rotation relative thereto for the purpose of indicating kilowatt hours in the amount of 10 to 100. Several orders of dials and pointers are usually provided and the aforesaid patent shows 5 orders of pointers and dials in an arrangement which is well known in the art.

It will be assumed that the meter located at the metering station 1 is energized from a single-phase two-wire alternating-current circuit operating at a power frequency such as 60 Hertz and represented by conductors L1 and L2.

A winding 113 which corresponds to the voltage winding of the aforesaid patent is shown connected across the conductors L1 and L2.

The metering station 1 also has a transmitter for transmitting signals to the remote station 3. This transmitter is energized from the conductors L1 and L2 through a transformer 11 having a primary winding 11P connected across the conductors L1 and L2 and having a secondary winding 11S which is designed to have an output voltage of the order of 12 volts. The secondary winding 11S supplies current to the signal transmission circuit 5 alternately through two circuits which are controlled by a cam-operated switch 13. One of the circuits includes a rectifier 15 and a first set of contacts 13A of the switch 13. The second circuit includes a rectifier 17 which is controlled by a set of contacts 13B of the switch 13. Preferably the switch 13 is of a type which moves between a position closing the contacts 13A and a position closing the contacts 13B with a snap action or with negligible time delay.

As illustrated in FIG. 1, the switch 13 is operated by a cam 19 which is mounted on the shaft supporting the pointer 7A for rotation in unison with the pointer. The switch 13 has an operating stem which serves as a cam follower biased toward the cam 19. The cam has one or more lobes for moving the switch 13 to the right as viewed in FIG. 1. In a preferred embodiment of the invention the cam 19 has ten cam lobes uniformly distributed about the axis of the cam. As a cam lobe moves past the switch stem it forces the switch to the right as viewed in FIG. 1 to open the contacts 13A and close the contacts 13B. As the lobe passes the stem the spring bias acting on the stem moves the switch 13 to open the contacts 13B and close the contacts 13A. As previously noted these movements of the switch 13 preferably are effected substantially with no time delay.

By inspection of FIG. 1 it will be noted that the rectifiers 15 and 17 are oppositely poled. Thus when the switch 13 closes the contacts 13A, a group of unidirectional pulses having a first polarity are supplied to the circuit 5. When the switch 13 closes the contacts 13B, a group of unidirectional pulses having a second or opposite polarity are supplied to the circuit 5.

At the remote station 3 signals transmitted by the circuit 5 are utilized in suitable receiving means as for energizing the coil 21A of an electromagnet 21. This electromagnet has operating means which may include a soft magnetic circuit terminating in two spaced poles 21B and 21C between which a magnetic field is established which has a direction dependent on the polarity of the pulses applied to the coil 21A.

A polarized permanent-magnet armature 23 is located between the poles 21B and 21C. This armature is polarized to provide a north pole N and a south pole S. The armature is mounted for rotation about the axis of a shaft 25 for a limited distance.

As shown in FIG. 3, the armature 23 may comprise a tubular permanent magnet 27 which is concentric with respect to the shaft 25. This magnet is constructed of a high coercive material such as a barium-ferrite material. The pole N is in the form of a block of soft magnetic material having a pin N1 which is pressed into a hole provided in a soft magnetic arm 29 which is secured to the shaft 25. Similarly the pole S has a pin S1 which is a press fit in a hole provided in a soft magnetic arm 31 which is secured to the shaft 25. The permanent magnet 27 is magnetized to provide a desired polarity of the poles N and S.

The receiving means may comprise operating means such as a double pawl 35 having pawl arms 35A and 35B secured to the shaft 25 for rotation therewith. The pawl arms cooperate with the teeth of a toothed wheel 37 which is mounted for rotation relative to the electromagnet about an axis parallel to the axis of the shaft 25. The pawl 35 is operable between a first condition wherein the pawl arm 35A is adjacent the wheel 37 and a second condition wherein the pawl arm 35B is adjacent the wheel. A spring detent 39 is mounted to hold the toothed wheel 37 in any position to which it is rotated by the pawl 35. The pawl 35 and the tooth wheel 37 are so configured that each movement of the pawl 35 rotates or steps the wheel 37 in the same direction.

At the remote station 3 a register 41 is provided which is similar to the register 133 located at the metering station 1. For example, the register 41 has a units dial 43 and a pointer 43A which correspond to the dial 7 and the pointer 7A of the register 133. The toothed wheel 37 is coupled to the pointer 43A for the purpose of rotating the pointer 43A substantially in unison with rotation of the pointer 7A at the metering station 1. Thus the reading of the register 41 is similar to that of the register 133. IN the embodiment of the drawing, the wheel 37 and the pointer 43A are mounted on a common shaft.

In order to explain the operation of the system, it will be assumed that the parts are in the positions illustrated in FIG. 1 and that the pointer 7A is rotating for the purpose of indicating the electric energy being measured at the metering station. At this time, the contacts 13A are closed and the coil 21A thus is connected across the secondary winding 11S through the rectifier 15. This results in the application to the coil 21A of a group of unidirectional pulses which are assumed to be in the proper direction to make the pole 21B, a south pole and the pole 21C a north pole. The resulting magnetic attraction between the armature 23 and the poles 21B and 21C holds the armature in the position shown in FIG. 1. When the next cam lobe of the cam 19 passes beneath the stem of the switch 13 it forces the switch rapidly to the right as viewed in FIG. 1. As a result of the opening of the contacts 13A the pulses supplied through the rectifier 15 cease. However because of the prompt closing of the contacts 13B, the coil 21A is connected across the secondary winding 11S through the rectifier 17. The secondary winding now supplies a group of unidirectional pulses to the coil 21A which are in a direction making the pole 21B a north pole and the pole 21C a south pole. The attraction of the armature 23 relative to the poles 21B and 21C results in a counterclockwise rotation of the armature 23 about its axis as viewed in FIG. 1 and the arm 35A advances the toothed wheel 37. The attraction between the armature 23 and the poles 21B and 21C holds the armature securely in its new position. The movement of the toothed wheel 37 advances the register 41.

When the cam lobe passes the stem of the switch 13, the bias of the switch rapidly moves the switch to open the contacts 13A. This discontinues the supply of pulses through the rectifier 17 to the coil 21A and restores the supply of pulses to the coil through the rectifier 15. The pulses now supplied to the coil make the pole 21B a south pole and the pole 21C a north pole. The resulting attraction forces are such that the armature 23 is rotated in a clockwise direction as viewed in FIG. 1 to the position shown in such figure. The pawl arm 35B now engages the toothed wheel 37 for the purpose of advancing the toothed wheel. The toothed wheel in turn advances the register 41.

Each of the two arms 35A and 35B advances or steps the toothed wheel through an angular distance for each cycle of operation of the pawl. In the specific embodiment herein discussed, the total of these two angular distances is 36°. Thus each step may be through an angular distance of 18°. In actual practice, it is convenient to employ unequal steps such as 15° for one arm and 21° for the other arm.

This restores the parts to the assumed starting positions and completes the cycle of operation. As the pointer 7A continues to rotate, each passage of a cam lobe past the stem of the switch 13 causes a repetition of the aforesaid cycle.

It will be noted that the pointer 43A of the register 41 is advanced only when the polarity of the signal transmitted by the circuit 5 is reversed. This minimizes the possibility of false registration at the remote station due to intermittent initial closure of the switch 13.

There is substantially no "off" period in signal transmission over the circuit 5. The movement of the switch 13 is small and rapid. This minimizes possibility of movement of the pointer 43A of the register 41 as a result of vibration or externally induced transients.

For the same reason, the armature 23 is substantially always attracted to one or the other of its positions. In effect, it is "latched" in one position or the other by the magnetic attraction between the armature and the fixed poles. This minimizes the possibility of false registration at the remote station in the case of a loss of supply voltage during the transmission of an operating signal and also minimizes the possibility of any movement of the pointers of the remote register as a result of vibration during such periods.

I claim:

1. In a pulse-receiving device, electromagnet means comprising a soft magnetic core having spaced first and second pole faces, winding means effective when energized in a first direction for making said first and second pole faces respectively magnetic north and south pole faces, said winding means being effective when energized in a second direction for making said first and second pole faces respectively magnetic south and north pole faces, a polarized magnetic armature having a north pole and a south pole, means mounting said armature for rotation relative to said electromagnet means between a first position wherein said north and south poles respectively are adjacent to the first and second pole faces and a second position wherein said north and south poles respectively are adjacent to the second and first pole faces, a rotary member mounted for rotation about an axis, and a pawl unit coupled to the armature for movement by the armature between two positions in response to movement of the armature between said first and second positions, said pawl unit being constructed and disposed relative to said rotary member such that said member is rotated by said pawl unit each time said pawl unit moves between its two positions, with said rotary member rotating in the same direction regardless of which of the two positions said pawl unit is being moved to.

2. A pulse-receiving device as claimed in claim 1 wherein the polarized magnetic armature comprises a permanent magnet for establishing the polarization of the armature, the rotary member comprises a ratchet wheel having teeth uniformly distributed about the circumference of the wheel, and the pawl unit includes a pair of spaced pawl members mounted for alternate movement into engagement with said ratchet wheel in response to the movement of the armature between the first and second positions for successively rotating the ratchet wheel in only one direction of rotation.

3. A transmitting system for transmitting information to a pulse receiving device from a remote transmitting station, said remote transmitting station comprising a rotatable member, and switch means responsive to rotation of the rotatable member in one direction for operating alternately between two transmitting positions to transmit alternately to the pulse-receiving device successive electric signals of alternate polarity, said pulse-receiving device including electromagnet means comprising a soft magnetic core having spaced first and second pole faces, winding means effective when energized by a signal of one polarity from said remote transmitting station for making said first and second pole faces respectively magnetic north and south pole faces, and effective when energized by a signal of opposite polarity for making said first and second pole faces respectively magnetic south and north pole faces, a polarized magnetic armature having a north pole and a south pole, means mounting said armature for rotation relative to said electromagnet means between a first position wherein said north and south poles respectively are adjacent to the first and second pole faces and a second position wherein said north and south poles respectively are adjacent to the second and first pole faces, a rotary member mounted for rotation about an axis, and a pawl unit coupled to the armature for movement by the armature between two positions in response to movement of the armature between said first and second positions, said pawl unit being constructed and disposed relative to said rotary member such that said rotary member is rotated by said pawl unit each time said pawl unit moves between its two positions, with said rotary member rotating in the same direction regardless of which of the two positions said pawl unit is being moved to.

4. A combination as claimed in claim 3 wherein said switch means operates with a snap action between said two transmitting positions.

* * * * *